United States Patent [19]
Johns-Vano et al.

[11] Patent Number: 6,081,896
[45] Date of Patent: Jun. 27, 2000

[54] CRYPTOGRAPHIC PROCESSING SYSTEM WITH PROGRAMMABLE FUNCTION UNITS AND METHOD

[75] Inventors: Kerry Lucille Johns-Vano, Scottsdale; David Michael Harrison, Mesa, both of Ariz.; Phillip Anthony Carswell, Garland, Tex.; Kevin Thomas Campbell, Glendale; Dadario McCutcheon, Mesa, both of Ariz.

[73] Assignee: Motorola, Inc., Schaumburg, Ill.

[21] Appl. No.: 08/922,056

[22] Filed: Sep. 2, 1997

[51] Int. Cl.[7] ........................................... G06F 12/14
[52] U.S. Cl. .................. 713/200; 712/228; 712/245; 712/229; 712/43; 710/1; 709/1; 709/107; 709/108
[58] Field of Search ............... 713/200; 380/21, 380/3; 714/819–824

[56] References Cited

U.S. PATENT DOCUMENTS 4,887,239  12/1989  Turner ...................................... 365/185
5,365,591  11/1994  Carswell et al. ........................... 380/49
5,369,314  11/1994  Patel et al. ................................ 326/13

OTHER PUBLICATIONS

An Article entitled "Crypris* CrYPtographic Reduced Instruction Set Microprocessor" from Lockheed Martin.

*Primary Examiner*—Gail O. Hayes
*Assistant Examiner*—Christopher M. Tucker
*Attorney, Agent, or Firm*—Gregory J. Gorrie

[57] ABSTRACT

A programmable cryptographic system (100) provides high performance cryptographic processing support for cryptographic algorithms. Two or more independent cryptographic algorithms may be performed at the same time through the processes of background staging and algorithm multitasking. A four stage software instruction pipeline and dynamically programmable function units support high performance cryptographic processing performance on the order of 60 mega bits per second (Mbps) aggregate throughput.

25 Claims, 3 Drawing Sheets

CRYPTOGRAPHIC PROCESSING SYSTEM WITH PROGRAMMABLE FUNCTION UNITS AND METHOD

CROSS-REFERENCE TO RELATED APPLICATIONS

This application is related the following to co-pending U.S. Patent Application Serial Numbers which is assigned to the same assignee as the present application:

1) U.S. patent application Ser. No. 08/841,314 filed on Apr. 28, 1997 entitled "Programmable Crypto Processing System and Method";
2) U.S. patent application Ser. No. 08/904,991 filed on Aug. 1, 1997 entitled "Configurable Cryptographic Processing Engine and Method"; and
3) U.S. patent application Ser. No. 08/949,082 filed on Oct. 10, 1997 entitled "Method and System for Managing Data Unit Processing".

FIELD OF THE INVENTION

This invention relates in general to the field of processing systems, in particular to systems for cryptographic processing.

BACKGROUND OF THE INVENTION

Trends in the communications market have clearly defined the need for security for both commercial and military markets. As communications systems become more sophisticated with complex communication services and capabilities, it is important to keep information secure. One of the problems with secure equipment is interoperability between existing and future communications products. As new products are introduced and expected to become part of a larger secure communications system, the need for integrating legacy and emerging technology becomes imperative. Another problem with modern communications equipment is that secure hardware implementations are commonly difficult to design and expensive to manufacture. The manufacture of secure hardware often requires special semiconductor foundries which operate in an expensive, high security environment. Another problem with hardware implementations of secure communications equipment is the difficulty in reconfiguring the hardware. Typical hardware implementations are difficult to reconfigure and reprogram when equipment must perform various functional activities in a non-homogeneous communications environment.

Communications equipment implemented with software, however, are typically not considered as secure as hardware implementations because of the accessibility of the software. A typical problem with software implementations is that concurrent processing of multiple programs results in performance loss due to program swapping in a secure operating system.

Thus, what is needed are an improved cryptographic processing system and method suitable for use in cryptographic systems. What is also needed are a cryptographic processing system and method that provides interoperability between existing and emerging communications technologies. What is also needed is a cryptographic processing system and method that do not necessarily need to include cryptographic programs during manufacture and can be fabricated in commercial semiconductor foundries thereby reducing costs. What is also needed is a cryptographic system and method which are programmable and capable of performing various and changeable communications functions. What is further needed is a cryptographic system and method which provide a high security software component with limited accessibility. What is also needed is a cryptographic system and method which rapidly and securely switches programs and context for each data unit processed.

BRIEF DESCRIPTION OF THE DRAWINGS

The invention is pointed out with particularity in the appended claims. However, a more complete understanding of the present invention can be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a programmable processing system and method. The present invention also provides a cryptographic processing system and method suitable for providing interoperability between existing and emerging communications technology. The present invention also provides a cryptographic processing system suitable for manufacture in commercial semiconductor foundries. The present invention also provides a cryptographic system and method which is programmable and capable of performing various and changeable communications functions. The present invention also provides a cryptographic system and method which can provide a high security software component with limited accessibility. The present invention further provides a cryptographic system and method which can rapidly and securely switch programs and context for each data unit processed.

Figure 1:
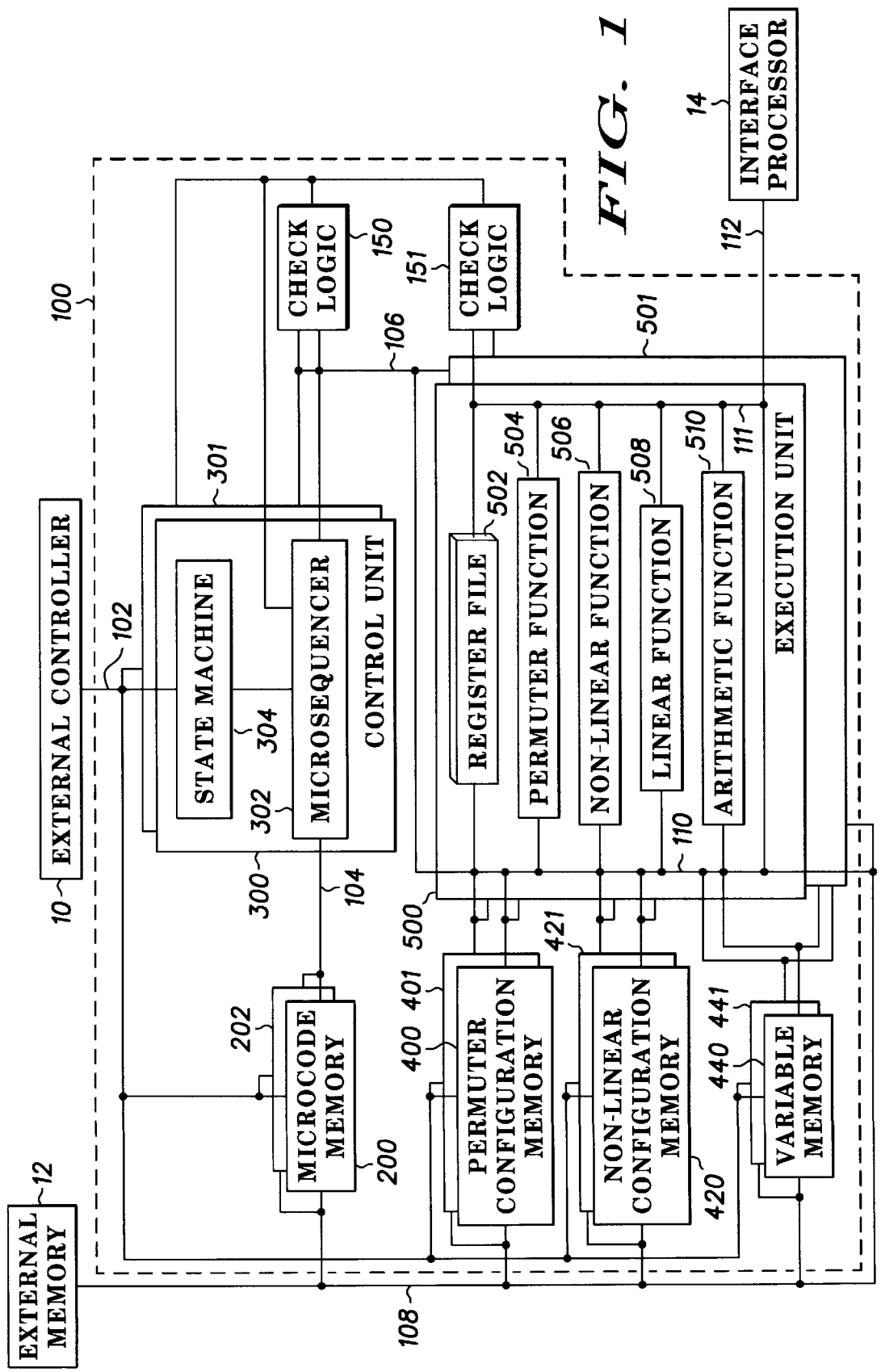
FIG. 1 illustrates a simplified hardware block diagram of a programmable cryptographic system (PCS) in accordance with a preferred embodiment of the present invention.

FIG. 1 illustrates a simplified hardware block diagram of a programmable cryptographic system 100 (PCS) in accordance with a preferred embodiment of the present invention. In the preferred embodiment, PCS 100 includes active microcode memory 200, shadow microcode memory 202, control unit 300, redundant control unit 301, active permuter configuration memory 400, shadow permuter configuration memory 401, active non-linear configuration memory 420, shadow non-linear configuration memory 421, active variable memory 440, shadow variable memory 441, execution unit (EU) 500, redundant execution unit 501, first check logic 150, and second check logic 151.

Active microcode memory 200 and shadow microcode memory 202 are coupled to external controller 10 and control unit 300 and redundant control unit 301 through interface and control bus 102. Active microcode memory 200 and shadow microcode memory 202 are coupled to external memory 12 through address and RAM bus 108. Active microcode memory 200 and shadow microcode memory 202 are coupled to control unit 300 and redundant control unit 301 through address and data bus 104. Each microcode memory can perform as an "active" and "shadow" microcode memory element.

"Active" and "shadow" are titles associated with selected elements of PCS 100 which are related to procedures associated therewith. For example, when PCS 100 is being setup to perform an operation, the setup for the operation is performed in "background staging" mode. Background staging is a mode where a setup and configuration procedure is performed which prepares PCS 100 to process data. Elements, such as memory, registers, and others, which are associated with background staging mode are titled "shadow" elements. Elements which are titled shadow elements are preferably determined by external controller 10. Alternatively, an example of "active" mode elements is when shadow elements previously associated with the background staging mode are currently being used in processing data. More specifically, elements titled shadow during a setup and configuration procedure are titled active when those same elements are used in processing data. Other examples of active and shadow elements are when microcode memory 200 is titled the shadow memory and microcode memory 202 is titled the active memory and vice versa.

Control unit 300 and redundant control unit 301 are coupled to external controller 10 and active microcode memory 200 and shadow microcode memory 202 through interface and control bus 102. Control unit 300 and redundant control unit 301 are coupled to EU 500 and redundant EU 501 and first check logic 150 through control and status bus 106. In the preferred embodiment, control unit 300 and redundant control unit 301 each contain a microsequencer. In another embodiment, control unit 300 and redundant control unit 301 also each contain control finite state machine 304 (CFSM). In the embodiment having CFSM 304, CFSM 304 is comprised of hardware control logic and software which, among other things, provides a status monitor for alarm conditions and provides high level control of microsequencer 302. In the preferred embodiment, control unit 300 and redundant control unit 301 each contain a microsequencer which provides software control of PCS 100. Software control can also provide, for example, a status monitor for alarm conditions, high level control of microsequencer 302, and status and other types of operations. Additionally, software control provided by each microsequencer provides control information to EU 500 and redundant EU 501. The control information provided by each microsequencer and presented to EU 500 and redundant EU 501 controls the routing of data which is processed in the EUs. Preferably, redundant control unit 301 and redundant execution unit 501 perform the redundant functionality of control unit 300 and execution unit 500, respectively.

Active permuter configuration memory 400, shadow permuter configuration memory 401, active non-linear configuration memory 420, shadow non-linear configuration memory 421, active variable memory 440, and shadow variable memory 441 are each coupled to external memory 12 through address and RAM bus 108, external controller 10 through interface and control bus 102, and EU 500 and redundant EU 501. When a memory is performing as the active element of that type (e.g., active permuter configuration memory), another element of that type is performing as the shadow element (e.g., shadow permuter configuration memory). Since the active and shadow of each memory type is determined by external controller 10, each configuration memory and each variable memory can perform as an active and shadow memory element. In another embodiment, one or more configuration memories for another type of function unit can store configuration information for the function unit associated therewith. For example, other types of function units include trigametric function units, modulo function units, and logarithmic function units.

EU 500 and redundant EU 501 are coupled to control unit 300 and redundant control unit 301, respectively, via control and status bus 106. EU 500 and redundant EU 501 are coupled to active permuter configuration memory 400, shadow permuter configuration memory 401, active non-linear configuration memory 420, shadow non-linear configuration memory 421, active variable memory 440 and shadow variable memory 441. EU 500 and redundant EU 501 are also coupled to external memory 12 through address and RAM bus 108. Furthermore, EU 500 and redundant EU 501 are coupled to interface processor 14 through interface processor bus 112. Additionally, when an output value from EU 500 and a corresponding output value from redundant EU 501 fail to compare when evaluated by second check logic 151, an alarm signal is propagated to external controller 10 from each microsequencer of control unit 300 and redundant control unit 301. In the preferred embodiment, EU 500 and redundant EU 501 each contain a register file, permuter function unit, non-linear function unit, linear function unit, and arithmetic function unit. In the preferred embodiment, the register file and the function units are internally coupled to each other by parallel input bus 110 and parallel output bus 111. Parallel input bus 110 can deliver up to four dwords of data to permuter function unit 504 and two dwords of data to arithmetic function unit 510 concurrently. When using parallel output bus 111, up to four dwords of data can be provided to non-linear function unit 506 and five dwords of data can be provided to linear function unit 508 concurrently. Therefore, using parallel input bus 110 and parallel output bus 111, as many as fifteen dwords of data can be processed by the function units in one clock cycle. A dword is discussed in a later section.

PCS 100 is a programmable cryptographic system which, when programmed, can perform cryptographic operations on a data unit (e.g., pre-formatted data). In the preferred embodiment, a data unit comprises at least one header dword, a command dword, and one or more payload data dwords. A dword is some representation of data (e.g., 32-bits of data).

A header of a data unit preferably contains two dwords, which includes, among other things, a reference to a destination location. A destination location is comprised of a logical location and physical location. The logical location is the location (e.g., function unit) where data is to processed. The physical location is the output location where processed dwords are written (e.g., interface processor).

A command dword of a data unit determines the operation within a channel program to perform on a payload portion of a data unit. A channel program is comprised of a set of operations. The operations of the channel program are comprised of software instructions which perform, among other things, cryptographic operations on a data unit. Examples of operations contained within a channel program are encryption of plain-text data, decryption of cipher-text data, in-band signaling required for bit, word, and frame formatting, detection of in-band signals, instruction for operations such as receive over-the-air-rekey (OTAR) data, protocol conversion, and other programmable operations. A channel program is preferably created external to the PCS.

Payload data contains, among other things, dwords which are processed by a channel program. Preferably, payload data size is between 1 and 4094 dwords although other sizes are also suitable.

PCS 100 is background staged by external controller 10. Preferably, external controller 10 performs a background staging procedure for a channel program to prepare PCS 100 for processing data units. External controller 10 preferably provides external control when preparing PCS 100 to process data units. A data unit is preferably stored in external memory 12 prior to processing. Following the processing of a data unit, the data unit is preferably written to external interface processor 14.

When performing the background staging procedure, external controller 10 loads a channel program from external memory 12 into the shadow microcode memory, either memory 200 or 202. External controller 10 determines the microcode memory to receive a channel program. In the preferred embodiment, external controller 10 determines which microcode memory 200 or 202 is the shadow microcode memory to receive a channel program.

External controller 10 provides high level control over control unit 300 and redundant control unit 301. Preferably, control unit 300 and redundant control unit 301 execute the same channel program from the active microcode memory. Control unit 300 and redundant control unit 301 are comprised of functionally similar hardware and software although each control unit can contain hardware and software which is the logical complement of the other. A first check logic 150 examines output from control unit 300 and redundant control unit 301 to provide an inspection of the output value. In the preferred embodiment, first check logic 150 provides an alarm signal which is propagated to external controller 10 by each microsequencer when control unit 300 and redundant control unit 301 produce a conflicting output value. PCS 100 will also function without the redundant control unit and redundant execution unit.

Among other things, control unit 300 and redundant control unit 301 each contain microsequencer 302. In the preferred embodiment, microsequencer 302 contains a four stage instruction pipeline. The instruction pipeline is comprised of a set of processing elements to perform fetch, read, execute, and write operations on channel program instructions stored in the active microcode memory. Each processing element can perform its associated function (e.g., fetch, read, execute, write) concurrently with the other processing elements. During the fetch operation, microsequencer 302 retrieves the next channel program instruction from active microcode memory. During the read operation, among other things, microsequencer 302 causes data unit information stored in external memory 12 and the active variable memory, and state and variable information (e.g., context) stored in register file 502 to be sent to the function units. During the execute operation, for example, microsequencer 302 executes a previously retrieved channel program instruction. Among other things, executing a channel program instruction can include, for example, providing control information to the function units for performing operations on a data unit. When processing is complete on a data unit, microsequencer 302 can write output to external interface processor 14. In the preferred embodiment, when microsequencer 302 is performing a write operation, the operation is performed with external memory 12 and interface processor 14.

Preferably, EU 500 and redundant EU 501 provide cryptographic algorithm support for microsequencer 302. EU 500 and redundant EU 501 are programmable elements which perform, among other things, cryptographic type operations on data units. Preferably, function units for EU 500 and redundant EU 501 perform cryptographic type operations and general purpose operations in accordance with channel programs executed by the associated microsequencer. Configuration information for a function unit can be stored in a configuration memory during a background staging procedure. The configuration information can represent, for example, bit reordering rules for a permuter function unit and table lookup data for a non-linear function unit. Other configuration information can be stored for other types of function units. Other types of function units which use configuration information include, for example, trigametric function units, modulo function units, and logarithmic function units. Some other types of function units which do not use configuration information include, for example, multiply accumulate, and math conversions (e.g., divider, etc.) function units.

In the preferred embodiment, EU 500 and redundant EU 501 are each comprised of, among other things, a register file, and function units. Register file 502 stores, for example, channel program variable and state information and intermediate results from operations performed by function units on data units. Permuter function unit 504 performs permuter operations on a data unit. Permuter operations include, for example, bit reordering and bit replication operations on a data unit. Non-linear function unit 506 performs non-linear operations on a data unit. Non-linear operations include, for example, table lookup operations on a data unit. Table lookup can be performed by "looking up" some value from a table of values which corresponds to some portion of a data unit. Linear function unit 508 performs linear operations on a data unit. Linear operations include, for example, exclusive-or operations on some portion of a data unit. Arithmetic function unit 510 performs arithmetic operations on a data unit. Arithmetic operations include, for example, binary addition, logical "anding", and other arithmetic operations.

Active permuter configuration memory 400 and shadow permuter configuration memory 401 store configuration information to configure a function unit, such as permuter function unit 504, to perform permuter operations. When permuter function unit 504 performs as a permuter, it is configured in accordance with a channel program. When microsequencer 302 executes a channel program, a permuter function unit can be used to perform bitwise reordering operations on a data unit. For example, when the active channel program is executed by microsequencer 302, the channel program may require bitwise reordering operations for some portion of a data unit. The permuter function unit can perform the bitwise reordering operations. The configuration information in the active permuter configuration memory are referenced by the permuter function unit to determine the hardware configuration to achieve the bitwise operations.

Active non-linear configuration memory 420 and shadow non-linear configuration memory 421 store configuration information to configure a function unit, such as non-linear function unit 506, to perform non-linear operations. When non-linear function unit 506 performs non-linear operations, it is configured in accordance with a channel program. When microsequencer 302 executes a channel program, a non-linear function unit can be used to perform table lookup operations on a data unit. For example, when the active channel program is executed by microsequencer 302, the channel program can require table lookup operations which replace some portion of a data unit with some other data value contained in some pre-determined table of values. The configuration information in the active non-linear configuration memory is referenced by the non-linear function unit to determine the hardware configuration to achieve the table lookup operations. The configuration information in the active non-linear configuration memory can store the table lookup data referenced by the non-linear function unit.

Active variable memory 440 and shadow variable memory 441 store state and variable information in accordance with the associated channel program. Register file 502 is also used to store state and variable information. When either state or variable information or both are stored in variable memory, the register file, or both, the information is titled the "context" or "context information" for a channel program. Accordingly, the memory associated with the either state or variable information or both is titled the "context memory". In the embodiment of the present invention where active and shadow variable memories store the context information of a channel program, the active and shadow variable memories are titled active and shadow context memories, respectively. State information represents one or more states of the associated channel program and is part of the channel program. Variable information represents one or more variables of the associated channel program and is part of the channel program.

In the preferred embodiment, PCS 100 is fabricated in a single very large scale integrated (VLSI) circuit, however custom cell design, gate array, field programmable gate array, multi-chip module, or other technology providing approximately 1.8 million transistors are also suitable.

Figure 2:
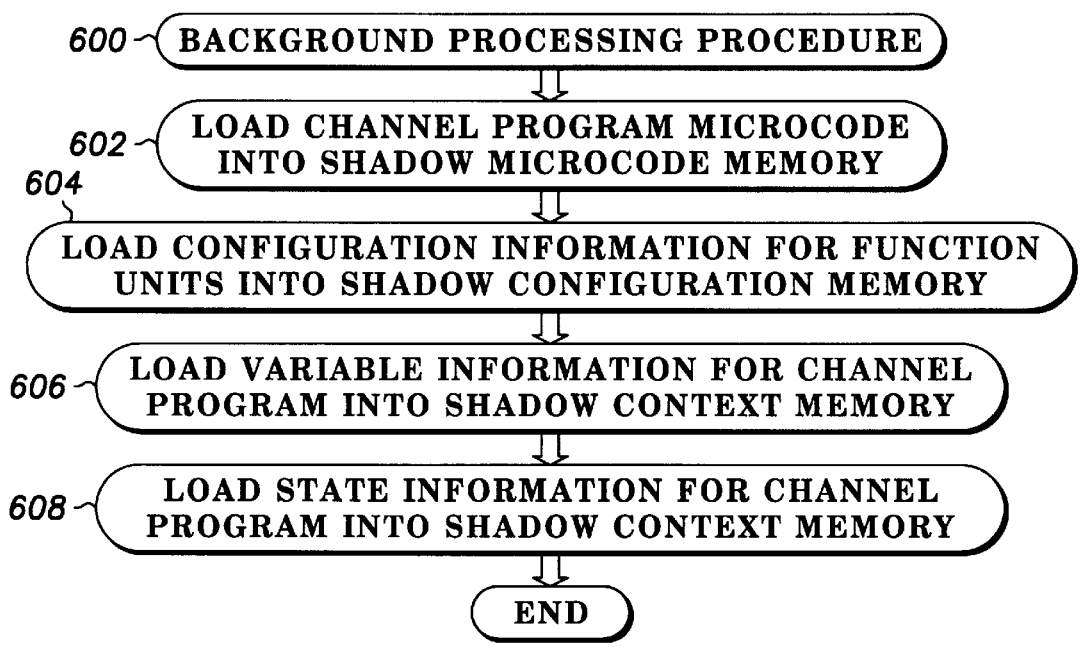
FIG. 2 is a flow chart of a background processing procedure in accordance with a preferred embodiment of the present invention.

FIG. 2 is a flow chart of a background processing procedure in accordance with a preferred embodiment of the present invention. Procedure 600 is preferably performed by an external controller for, among other things, loading microcode representing a channel program, context for the channel program, and configuration information for the function units into PCS 100 (FIG. 1). The instructions, context, and configuration information are preferably loaded into PCS shadow memory elements. In the preferred embodiment, procedure 600 is performed in a background staging mode for PCS 100 (FIG. 1). Procedure 600 is preferably performed for each data unit during the processing of a prior data unit.

In task 602, microcode representing a channel program is loaded into memory. In the preferred embodiment, an external controller copies microcode representing a channel program from an external memory into the shadow microcode memory. An external controller determines which memory is the shadow memory.

In task 604, configuration information for some function unit is copied into shadow configuration memory. In the preferred embodiment, configuration information for the permuter function unit (PFU) and non-linear function unit (NLFU) are copied into shadow permuter configuration memory and shadow non-linear configuration memory, respectively. Preferably, an external controller copies the configuration information from an external memory. Configuration information is preferably created by means external to the PCS. Configuration information comprises data which configures hardware to perform cryptographic operations on data units. Preferably, cryptographic operations are performed under control of the channel program in task 602. In one embodiment of the present invention where the permuter and non-linear function units are not needed to perform a channel program, task 604 is optional.

Configuration information for the permuter function unit is comprised of data which configures up to four 32-bit elements. The four 32-bit elements of the permuter can concurrently perform bit reordering operations on separate 32-bit dwords of payload data for a data unit. Therefore, four 32-bit dwords of payload data for a data unit can be processed concurrently. The four 32-bit dwords of payload data can be delivered to the permuter concurrently because of parallel input bus 110.

Configuration information for the non-linear function unit is comprised of data which represents table lookup data. The table lookup data is preferably stored in sixteen 256 by 1-bit random access memories (RAMs). Addressing for the sixteen RAMs is accomplished by dividing the 128-bit input to the function unit into sixteen 8-bit input addresses. Since the 8-bit address input for each of the sixteen memories provides a 1-bit output, the output value provided by the table lookup data is a 16-bit value. In the preferred embodiment, the sixteen RAMs are duplicated for redundancy and therefore provide outputs which can be checked for consistency. Preferably, the configuration memory for the non-linear function unit is contained within the non-linear function unit. The 128-bit input to the function unit is comprised of four 32-bit inputs provided via parallel input bus 110.

In task 606, variable information for a channel program is loaded into context memory. In the preferred embodiment, variable information represents a variable of a channel program and is part of the channel program. Variable information can contain, for example, a cryptographic encryption key for use in performing a cryptographic operation within a function unit. Variables include, for example, expanded cryptographic encryption key, transformed cryptographic encryption key, seed key, initialization key, and data required to start a cryptographic process. In one embodiment, data represented by variable information contains parity or checksum information which provides an integrity check over the data.

In task 608, state information for a channel program is loaded into context memory. In the preferred embodiment, state information represents the current state of a channel program. State information can contain, for example, a flag to the channel program. A flag can represent a signal to the channel program to either start or stop performing some operation.

Maintaining the variable and state information allows a channel program to be resumed after being swapped from shadow to active memory. The process of switching a channel program from shadow to active or active to shadow memory elements is titled context switching. Context switching allows data units to be processed sequentially without significant processing interruptions because of channel program loading delays.

Figure 3:
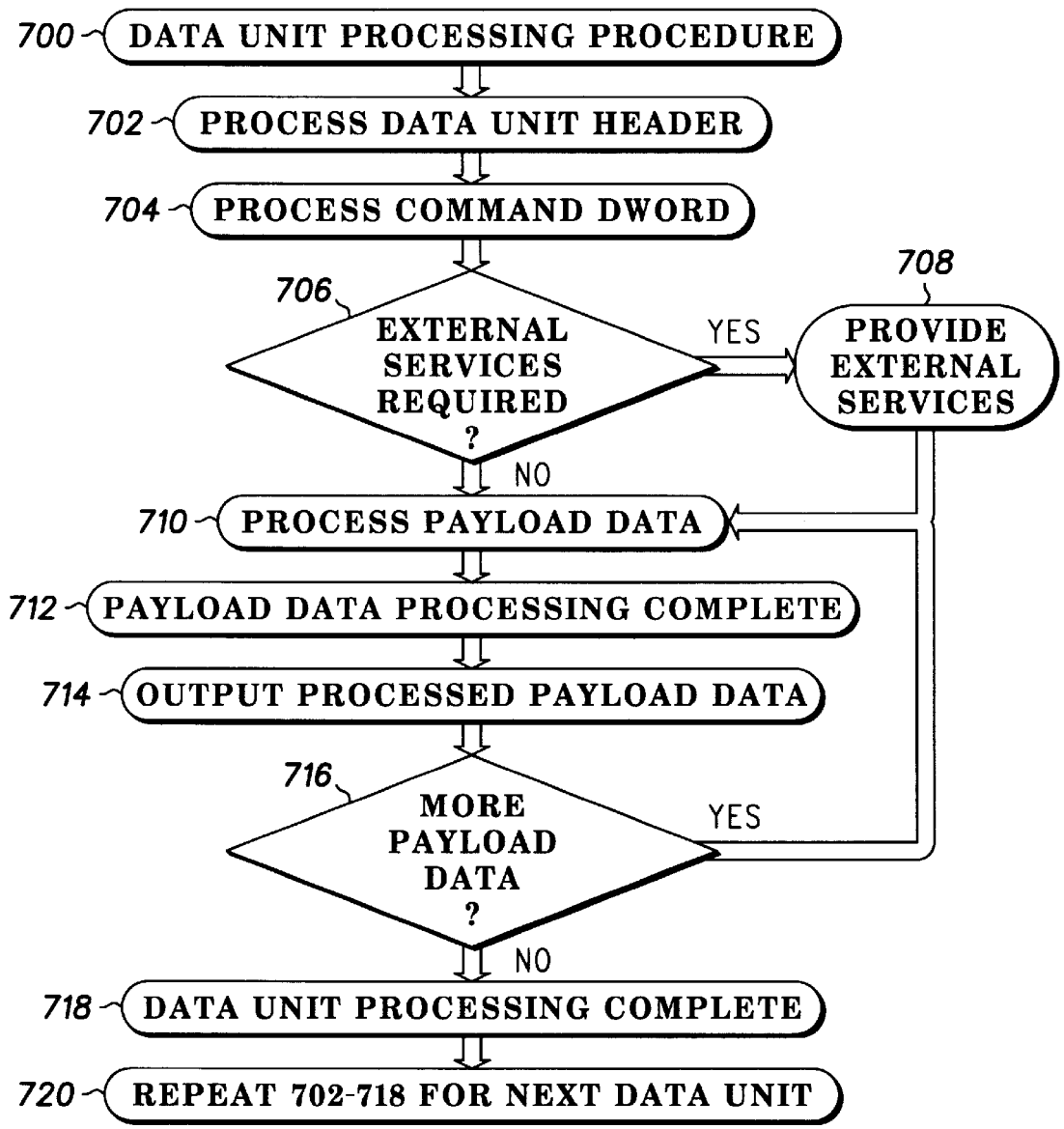
FIG. 3 is a flow chart of a data unit processing procedure in accordance with a preferred embodiment of the present invention.

FIG. 3 is a flow chart of a data unit processing procedure in accordance with a preferred embodiment of the present invention. Data units are preferably pre-formatted as discussed above. Procedure 700 is preferably performed by PCS 100 (FIG. 1) for, among other things, processing a data unit. Examples of processing a data unit are encryption of plain-text data, decryption of cipher-text data, in-band signaling required for bit, word, and frame formatting, detection of in-band signals, instruction for operations such as receive over-the-air-rekey (OTAR) data, protocol conversion, and other programmable operations. In the preferred embodiment, the active elements of procedure 700 were titled the shadow elements in procedure 600 (FIG. 2). Also, in the preferred embodiment, procedure 700 is performed concurrently with procedure 600.

In task 702, the header of a data unit is processed. In the preferred embodiment, the microsequencer of each control unit fetches and executes instructions of the same channel program from active microcode memory. The microsequencer also performs any read and write operations external to the PCS as a result of processing instructions. In the preferred embodiment, instructions of the channel program direct the microsequencer to copy the header of the data unit from external memory to a destination location. The destination location is preferably determined by information contained within the header of the data unit. In the preferred embodiment, the destination location is a storage location such as external memory or an external controller or processor. In another embodiment of the present invention, the destination location can be a "temporary" memory location in an external interface processor. In another embodiment, the destination location can be implied by the operation of the channel program being performed.

In task 704, a command dword of a data unit is processed. In the preferred embodiment, the command dword determines which operation in the channel program the microsequencer will perform. In the preferred embodiment, the command dword may determine, for example, the operation to perform is a data encryption operation.

In task 706, a check for external services is performed. In the preferred embodiment, the operation of the channel program being performed by the microsequencer may require service from an external source. For example, when the microsequencer is performing a data encryption operation, a random number can be required as part of the operation. The microsequencer can issue an external request for service to the external controller. In the preferred embodiment, the microsequencer requests external services, such as request for random number, by setting a bit in a register which is monitored by an external controller. When the external controller detects a request for service, task 708 is performed. When no external request for service is requested by the microsequencer, task 710 is performed.

In task 708, the external controller, or other suitable element, provides the requested service to the microsequencer. In the preferred embodiment, supplying a requested service can include, for example, writing a random number to a register which can be read by the microsequencer and written by the external controller.

In task 710, a portion of payload data for a data unit is processed. In the preferred embodiment, payload data is between one and fifteen dwords of data. The payload data loaded into the function units by the microsequencer is processed by the function units. For example, up to four 32-bit payload dwords can be processed in permuter function unit 504 (FIG. 1) and two payload dwords can be processed in arithmetic function unit 510 (FIG. 1) concurrently. When the feedback mechanism of the function units is used, an additional four inputs to non-linear function unit 506 (FIG. 1) and five inputs to linear function unit 508 (FIG. 1) can be processed.

In task 712, a processing complete flag is set in the status register of EU 500 and redundant EU 501 (FIG. 1). In the preferred embodiment, the microsequencer monitors the status register to determine when cryptographic operations are complete for the payload data in task 710.

In task 714, the processed payload data is written to output. In the preferred embodiment, when operations on payload data are complete, the processed payload data is written to an output destination. Preferably, the output destination is specified in the header of the associated data unit. In another embodiment, the output destination can be implied by the channel program being performed. In the preferred embodiment, a header can specify, for example, that processed dwords be written to an external memory or interface processor. Preferably, second check logic 151 (FIG. 1) provides an alarm signal which is propagated to external controller 10 (FIG. 1) from each microsequencer of control unit 300 and redundant control unit 301 when EU 500 and redundant EU 501 (FIG. 1) produce a conflicting output value.

In task 716, a check for additional payload data is performed. In the preferred embodiment, the microsequencer determines the number of dwords in the payload portion of a data unit to process. Preferably, the microsequencer determines the number of dwords to process from payload size information in the header of the data unit. When the microsequencer determines other dwords require processing, task 710 is performed by the microsequencer. When the microsequencer determines no other dwords require processing, task 718 is performed by the microsequencer.

In task 718, the microsequencer signals the external controller that processing for a data unit is complete. In the preferred embodiment, the microsequencer signals the external controller by setting a "done" bit in the function register for EU 500 and redundant EU 501 (FIG. 1). The function register is a dedicated purpose register for EU 500 and redundant EU 501 which, among other things, communicates status information between the redundant microsequencers and external controller. In the preferred embodiment, there is one function register for the two execution units.

In task 720, tasks 702–718 are repeated for other data units. In the preferred embodiment, the PCS performs procedure 700 on additional data units requiring the first channel program described above. Alternatively, a second channel program can be performed on a data unit, without destroying instructions and context for the first channel program and related configuration information for the function units. Because the PCS contains shadow and active elements, two separate channel programs, program contexts, and hardware configurations can be maintained by the PCS. Making use of background staging mode, the PCS can perform, among other things, high performance processing operations for cryptographic type algorithms.

Thus, an improved cryptographic processing system and method have been shown. What has also been shown are a programmable cryptographic processing system and method suitable for providing interoperability between existing and emerging communications technology. What has also been shown is a cryptographic processing system suitable for manufacture in commercial semiconductor foundries thereby reducing manufacturing costs. What has further been shown are a cryptographic system and method which are programmable and capable of performing various and changing communications functions. Also shown are a cryptographic system and method which provide a high security software component with limited accessibility. What has also been shown are a cryptographic system and method which rapidly and securely switches programs and context for each data unit processed.

What is claimed is:

1. A programmable cryptographic system for processing data units comprising:
   active and shadow microcode memories for storing first and second channel programs, respectively;
   a plurality of function units for performing operations on a data unit;
   active and shadow function unit configuration memories for storing configuration information for at least some of said plurality of function units;

active and shadow context memories for storing, respectively, state information of the first and second channel programs; and a microsequencer for processing one of the channel programs, the microsequencer providing control information to the plurality of function units in accordance with the one of the channel programs.

2. A programmable cryptographic system as claimed in claim 1 further comprising:

a control finite state machine coupled to the microsequencer, the control finite state machine providing high level control to the microsequencer, and providing a first status monitor of the microsequencer.

3. A programmable cryptographic system as claimed in claim 2 further comprising:

a plurality of redundant function units for performing operations on the data unit;

a redundant microsequencer for processing the one of the channel programs, the redundant microsequencer providing control information to the plurality of redundant function units in accordance with the one of the channel programs; and a redundant control finite state machine coupled to the redundant microsequencer, the redundant control finite state machine providing high level control to the redundant microsequencer, and providing a second status monitor of the redundant microsequencer.

4. A programmable cryptographic system as in claim 3 further comprising:

a first check logic for comparing a first output value of the microsequencer and a second output value of the redundant microsequencer, and providing a first alarm signal when the first output value and the second output value conflict with one another; and a second check logic for comparing a third output value of the plurality of function units and a fourth output value of the plurality of redundant function units, and providing a second alarm signal when the third output value and the fourth output value conflict with one another.

5. A programmable cryptographic system as claimed in claim 1 wherein the plurality of function units are comprised of:

a permuter function unit for performing bit reordering operations on the data unit;

a non-linear function unit for performing table lookup operations on the data unit;

a linear function unit for performing exclusive-or operations on the data unit; and a arithmetic function unit for performing arithmetic operations on the data unit.

6. A programmable cryptographic system as claimed in claim 5 wherein the active function unit configuration memory comprises:

a first memory portion for storing a first portion of configuration information for the permuter function unit in accordance with the first channel program; and a second memory portion for storing a first portion of configuration information for the non-linear function unit in accordance with the first channel program.

7. A programmable cryptographic system as claimed in claim 5 wherein the shadow function unit configuration memory comprises:

a first memory portion for storing a first portion of configuration information for the permuter function unit in accordance with the second channel program; and a second memory portion for storing a first portion of configuration information for the non-linear function unit in accordance with the second channel program.

8. A programmable cryptographic system as claimed in claim 1 wherein information associated with the first and second channel programs is stored the active and shadow context memories, respectively.

9. A programmable cryptographic system as claimed in claim 1 wherein each of the first and second channel programs is comprised of software instructions, and wherein the microsequencer processes said software instructions of the first and second channel programs using an instruction pipeline.

10. A programmable cryptographic system as claimed in claim 9 wherein the instruction pipeline provides a set of processing elements, the set of processing elements comprising:

means for fetching a first software instruction of the first channel program from the active microcode memory;

means for reading a first portion of the data unit from external memory, wherein the first portion of the data unit is read in accordance with a second software instruction of the first channel program;

means for executing an operation on a second portion of the data unit, wherein the operation is performed by at least one of the plurality of function units in accordance with a third software instruction of the first channel program, and a first state information; and means for writing a third portion of the data unit to a destination location, the third portion of the data unit being previously executed by the means for executing in accordance with a fourth software instruction of the first channel program.

11. A method for processing a sequence of data units comprising the steps of:

loading a first channel program into active microcode memory;

loading a first configuration information for a function unit into active function unit configuration memory;

loading first state information into active context memory;

processing the first channel program by a microsequencer;

providing control information to the function unit in accordance with the first channel program; and performing an operation on a data unit by the function unit.

12. A method as claimed in claim 11 wherein the loading steps are performed for a second channel program during the processing step performed by the microsequencer.

13. A method as claimed in claim 11 further comprising the steps of:

controlling high level microsequencer operations with a control finite state machine coupled to the microsequencer; and statusing the microsequencer to monitor alarms.

14. A method as claimed in claim 13 further comprising the steps of:

performing a second operation on the data unit with a redundant function unit;

controlling the redundant function unit with a redundant microsequencer, wherein the redundant microsequencer performs the first channel program;

controlling high level operations of the redundant microsequencer using a redundant control finite state machine coupled to the redundant microsequencer; and statusing the redundant microsequencer to monitor alarms.

15. A method as claimed in claim 14 further comprising the steps of:
   comparing a first output value of the microsequencer and a second output value of the redundant microsequencer by means of a first check logic;
   providing a first alarm signal when the first output value and the second output value conflict with one another;
   comparing a third output value of the function unit and a fourth output value of the redundant function unit by means of a second check logic; and
   providing a second alarm signal when the third output value and the fourth output value conflict with one another.

16. A method as claimed in claim 14 wherein the function unit and the redundant function unit are controlled in accordance with the first channel program processed by the microsequencer and the redundant microsequencer, respectively, further comprising the steps of:
   reordering bits of the data unit, the reordering step being performed by a permuter function unit and a redundant permuter function unit;
   looking up a value from a table, the value selected from the table being determined from a first portion of the data unit;
   substituting the first portion of the data unit with the value from the table, the looking up and substituting steps being performed by a non-linear function unit and a redundant non-linear function unit;
   performing an exclusive-or operation on the data unit, the exclusive-or operation being performed by a linear function unit and redundant linear function unit; and
   performing an arithmetic operation on the data unit, wherein the arithmetic operation is performed by a arithmetic function unit and a redundant arithmetic function unit.

17. A method as claimed in claim 16 further comprising the steps of:
   storing a first configuration information in the active function unit configuration memory to configure the permuter function unit and the redundant permuter function unit in accordance with the first channel program; and
   storing a second configuration information in the active function unit configuration memory to configure the non-linear function unit and the redundant non-linear function unit in accordance with the first channel program.

18. A method as claimed in claim 16 further comprising the steps of:
   storing a first configuration information in a shadow function unit configuration memory to configure the permuter function unit and the redundant permuter function unit in accordance with a second channel program; and
   storing a second configuration information in the shadow function unit configuration memory to configure the non-linear function unit and the redundant non-linear function unit in accordance with the second channel program.

19. A method as claimed in claim 11 further comprising the step of:
   loading variable information for the first channel program into a context memory.

20. A method as claimed in claim 11 wherein the microsequencer processes a set of software instructions for the first channel program, wherein the set of software instructions are processed in an instruction pipeline.

21. A method as claimed in claim 20 wherein processing of the data unit further comprises the steps of:
   fetching a first software instruction of the first channel program from the active microcode memory;
   reading a first portion of the data unit from an external memory, the first portion of the data unit being read in accordance with a second software instruction of the first channel program;
   outputting control information as result of executing a third software instruction, the control information causing the function unit to operate on a second portion of the data unit in accordance with the third software instruction of the first channel program, and a first state information; and
   writing a third portion of the data unit to a destination location, the third portion of the data unit being previously processed in accordance with a fourth software instruction of the first channel program.

22. A processing system comprising:
   a programmable function unit for performing an operation on a data unit; and
   a microsequencer for programming the programmable function unit for the operation in accordance with a channel program, wherein the microsequencer provides subsequent instructions of the channel program to reprogram the programmable function unit to perform a subsequent operation on the data unit.

23. A processing system as in claim 22 wherein the programmable function unit is one of a plurality of programmable function units, the plurality of programmable function units comprising:
   a permuter function unit for performing a bit reordering operation on the data unit;
   a non-linear function unit for performing a table lookup operation on the data unit;
   a linear function unit for performing a exclusive-or operation on the data unit; and
   a arithmetic function unit for performing an arithmetic operation on the data unit.

24. A processing system as in claim 23 further comprising a configuration memory having a first and second portion:
   the first portion for storing part of the channel program for programming the permuter function unit; and
   the second portion for storing another part of the channel program for programming the non-linear function unit.

25. A method of processing a data unit comprising the steps of:
   providing control information to a plurality of programmable function units in accordance with a set of instructions of a channel program;
   performing operations on the data unit with the plurality of programmable function units in accordance with the set of instructions; and
   repeating the providing step for subsequent instructions of the channel program to control the plurality of programmable function units for performing subsequent operations on the data unit, and
   wherein the performing operations step comprises the steps of:
      reordering bits of the data unit, the reordering step being performed by a permuter function unit;
      looking up a value from a table, the value selected from the table being determined from a first portion of the data unit;

substituting the first portion of the data unit with the value from the table, the looking up and substituting steps being performed by a non-linear function unit;

performing an exclusive-or operation on the data unit, the exclusive-or operation being performed by a linear function unit; and performing an arithmetic operation on the data unit, wherein the arithmetic operation is performed by a arithmetic function unit, and the method further comprises the steps of:

storing first instructions of the channel program in a configuration memory to program the permuter function unit; and storing second instructions of the channel program in the configuration memory to program the non-linear function unit.

* * * * *